United States Patent [19]

Kelman

[11] Patent Number: 5,681,519
[45] Date of Patent: Oct. 28, 1997

[54] METHOD OF SQUEEZE MOLDING A FOAM CORED ARTICLE

[75] Inventor: Josh Kelman, Dover, N.H.

[73] Assignee: Davidson Textron Inc., Dover, N.H.

[21] Appl. No.: 372,997

[22] Filed: Jan. 17, 1995

[51] Int. Cl.$^6$ .......................... B29C 45/14; B29C 45/16
[52] U.S. Cl. ...................... 264/257; 264/258; 264/275; 264/277; 264/278
[58] Field of Search ........................ 264/250, 255, 264/257, 258, 275, 276, 277, 278, 328.7; 249/91; 425/117, 127

[56] References Cited

U.S. PATENT DOCUMENTS

| | | | |
|---|---|---|---|
| 3,712,575 | 1/1973 | Bement et al. | 249/91 |
| 3,737,272 | 6/1973 | Segmuller | 425/248 |
| 3,983,196 | 9/1976 | Gray | 264/45.5 |
| 4,519,763 | 5/1985 | Matsuda et al. | 425/192 |
| 4,560,523 | 12/1985 | Plumley et al. | 264/250 |
| 4,714,579 | 12/1987 | Boden et al. | 264/328.6 |
| 4,880,583 | 11/1989 | Douglas | 264/257 |
| 4,891,176 | 1/1990 | Drysdale et al. | 264/257 |
| 4,986,948 | 1/1991 | Komiya et al. | 264/257 |
| 5,061,429 | 10/1991 | Yoshihara et al. | 425/117 |
| 5,096,243 | 3/1992 | Gembinski | 264/257 |
| 5,204,042 | 4/1993 | James et al. | 264/257 |
| 5,328,494 | 7/1994 | Kelman et al. | 65/60.1 |
| 5,336,458 | 8/1994 | Hutchison et al. | 264/257 |
| 5,401,449 | 3/1995 | Hill et al. | 264/266 |
| 5,454,706 | 10/1995 | Midorikawa et al. | 249/91 |

*Primary Examiner*—Angela Ortiz
*Attorney, Agent, or Firm*—Reising, Ethington, Barnard & Perry

[57] ABSTRACT

A composite plastic article having a foam core between reinforced plastic skin layers is made by placing foam spacers, a lower reinforcement preform, a foam core and an upper reinforcement preform on a lower mold part. An upper mold part is then mated with the lower mold part in a partially closed position to form a sealed mold cavity containing the foam spacers, reinforcement preforms and the foam core with fill spaces provided adjacent exterior surfaces of the reinforcement preforms. A low viscosity resin is then injected into the fill spaces while the mold parts are held in the partially closed position. The mold parts are then moved to a fully closed position. This distributes the resin across the exterior surfaces and forces the resin into the preforms so that the resin thoroughly penetrates throughout the interstices of the preforms and bonds to the foam core. The fill cavities are preferably filled with the low viscosity resin to about 50% of capacity by volume and the fill spaces are preferably completely eliminated when the mold parts are moved to the fully closed position. The foam spacers have a lower crush resistance than the reinforcement preforms and the foam core so that movement of the mold parts to the fully closed position crushes the foam spacers into waste grooves of the lower mold part.

9 Claims, 2 Drawing Sheets

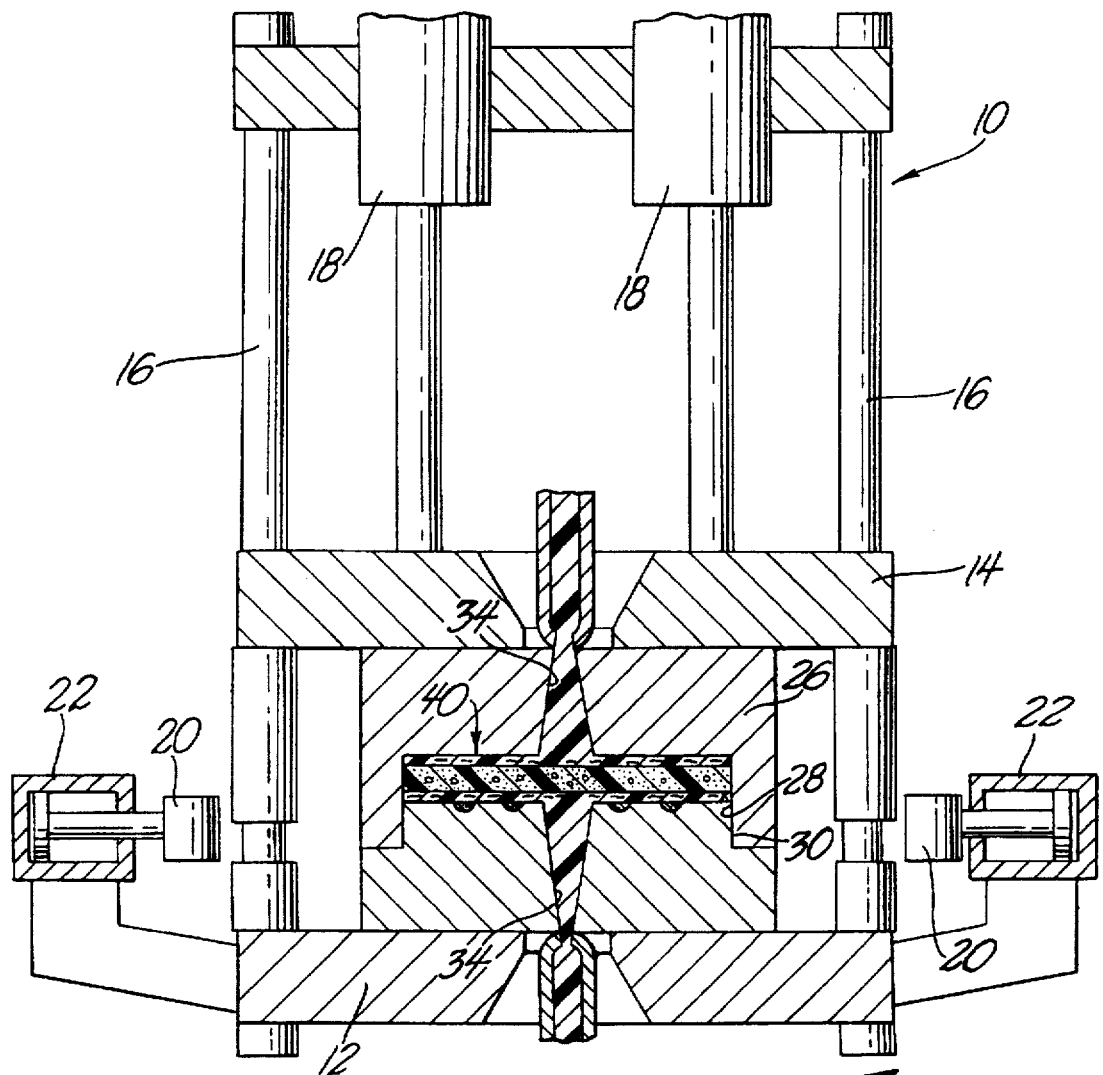
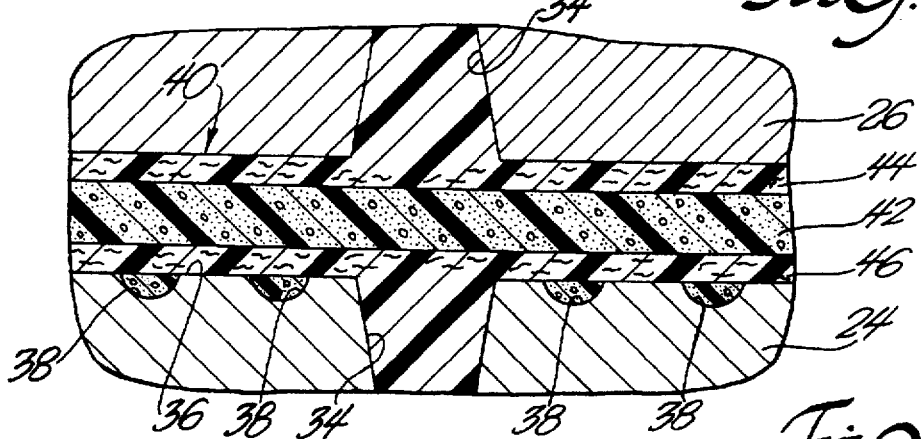

METHOD OF SQUEEZE MOLDING A FOAM CORED ARTICLE

BACKGROUND OF THE INVENTION

This invention relates generally to a method of squeeze molding a reinforced plastic article and more particularly to a method of squeeze molding a foam cored reinforced plastic article.

Glass fibers have been commonly incorporated in thermoplastic molded articles and other cured plastic articles for added strength and durability.

Reinforced plastic articles such as the structural reaction injection molded (SRIM) bumper for the Viper automobile may be made by a squeeze molding process. In the squeeze molding process a porous preform for reinforcing the molded plastic article, such as the porous fiberglass/resin preform that is described in U.S. Pat. No. 5,328,494 granted to Josh Kelman and Robert Hames Jul. 12, 1994, is placed in a lower half of an open, shear edge mold. The mold is then partially closed so that the mold cavity is sealed by the shear edge of the mold but still includes a fill space above the porous preform. This typically can be accomplished by holding the mold at a 0.100 inch open position, which is to say that there is approximately a 1/10 inch thick fill space above the porous preform.

A low viscosity resin is then injected into the fill space in an amount that only partially fills the fill space. Typically this is on the order of 50% of the volume of the fill space.

The mold is then completely closed so that the low viscosity resin flows throughout the porous preform. The mold is opened after the resin cures and the reinforced plastic article is removed from the open mold in a conventional manner.

While this method has been successfully used by the assignee of this invention on reinforced plastic articles such as the aforementioned SRIM bumper for the Viper automobile, this method is not entirely satisfactory for all types of reinforced plastic articles. For instance, the method is not suitable for composite plastic articles that include a relatively thick foam core between reinforced plastic skin layers, such as the panels of a truck bed.

SUMMARY OF THE INVENTION

The object of this invention is to provide a method and apparatus for squeeze molding a composite plastic article having a foam core between reinforced plastic skin layers.

A feature of the invention is that the mold is partially closed so as to provide fill spaces adjacent the respective porous preforms for reinforcing two skin layers on opposite sides of a foam core.

Another feature of the invention is that crushable foam spacers are used to provide a fill space adjacent a porous preform for reinforcing skin layer on a lower side of a foam core.

Still another feature of the invention is that the mold is specially configured for accommodating crushable foam spacers that provide a temporary fill space.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 2 shows the apparatus of FIG. 1 at a later stage in the process of squeeze molding a composite reinforced plastic article in accordance with the invention; and FIG. 3 is an enlargement of a portion of FIG. 2.

DESCRIPTION OF THE INVENTION

Figure 1:
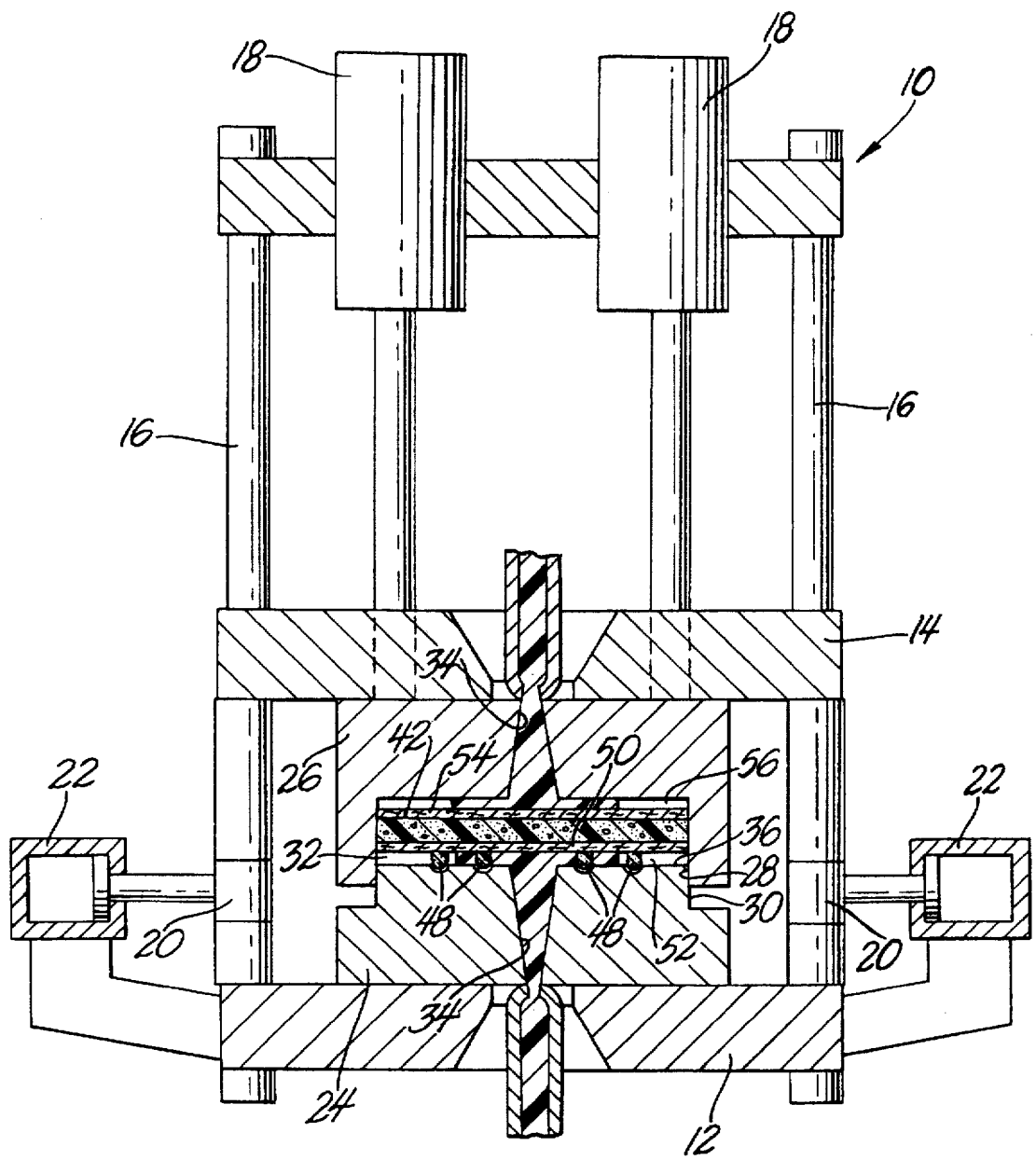
FIG. 1 shows an apparatus at an early stage in the process of squeeze molding a composite reinforced plastic article in accordance with the invention.

Referring now to the drawing and more particularly to FIG. 1, an apparatus 10 is illustrated at an early stage in the process of squeeze molding a composite reinforced plastic article in accordance with the invention.

Apparatus 10 comprises a lower stationary bed or platen 12 and an upper movable platen 14 that slides up and down on four guide rods 16 fastened at the respective corners of the stationery platen 12. Movement of the upper platen 14 is controlled by hydraulic motors 18 mounted on a stationery crosshead at the top of the guide rods 16.

Apparatus 10 further comprises four moveable blocks 20 each of which is associated with one of the respective guide rods 16 and controlled by a hydraulic motor 22. The hydraulic motors 22 move the blocks 20 laterally into and out of a blocking position below the upper platen 14 shown in FIG. 1. When the blocks 20 are moved into this blocking position, the blocks 20 limit the descent of the upper platen 14. When the blocks 20 are moved out of this position to a non-blocking position shown in FIG. 2, the blocks 20 do not interfere with the descent of the upper platen 14 which is then under the complete control of the hydraulic motors 18.

The apparatus 10 further includes a lower mold part 24 that is attached to the fixed lower platen or bed 12 and an upper mold part 26 that is attached to the moveable upper platen 14. The upper mold part 26 has an annular or closed perimeter shear mold edge 28 that is juxtaposed a cooperating annular or closed perimeter shear mold edge 30 of the lower mold part 24.

The upper and lower mold parts 24 and 26 cooperatively form a mold cavity 32 that is sealed by the juxtaposed shear mold edges 28 and 30 when the mold parts are at least partially closed as shown in FIG. 1.

The upper mold part 24 and the lower mold part 26 each include a gate passage 34 for introducing material into the mold cavity 32 through an associated nozzle.

The bottom surface 36 of the lower mold part 24 that forms a part of the mold cavity 32 has a plurality of spaced parallel grooves 38 as best shown in FIG. 3.

Apparatus 10 is used to squeeze mold a composite reinforced plastic article in accordance with the invention, such as the composite reinforced plastic article 40 shown in FIGS. 2 and 3 which comprises a foam core 42 between reinforced plastic skin layers 44 and 46.

To manufacture the article 40 in accordance with the invention, crushable foam spacers 48 are first laid in the grooves 38 of the lower mold part 24 so that they project above the bottom surface 36 as shown in FIG. 1. These crushable foam spacers 48 are typically made of urethane or expanded polypropylene beads and are formed so that they crush under low pressure, yet support preform weight before pressure is applied.

A porous reinforcement preform 50 for the lower plastic skin layer 46 is then placed on top of the spacers 48 so that a lower fill space 52 is provided between the bottom surface 36 and the exterior surface of the lower preform 50 as shown in FIG. 1. The porous reinforcement preform 50 is typically made of fiberglass and is formed so that it maintains dimensional integrity. See also U.S. Pat. No. 5,328,494 discussed above.

The foam core 42 is then placed on the porous reinforcement preform 50. The foam core 42 is typically made of urethane or thermoplastic expanded beads and is formed so that during the welding operation, the foam maintains its shape and does not allow resin penetration.

Another porous reinforcement preform 54 is then placed on the foam core 42 to provide the reinforcement for the upper skin layer 44. Preform 54 can be made of the same materials that are suitable for preform 50.

The foam spacers 48, reinforcement preforms 50, 54 and foam core 42 are placed on the lower mold part 24 when the upper platen 14 and the upper mold part 26 are in a raised position (not shown) that provide access to the lower mold part 24.

After the foam spacers 48, reinforcement preforms 50, 54 and foam core 42 are placed on the lower mold part 24 as shown in FIG. 1, the upper platen 14 and mold part 26 are lowered by the hydraulic motors 18 with the blocks 20 located in the interference position shown in FIG. 1. The upper platen descends 14 until it bottoms out on the blocks 20. This holds the mold parts 24 and 26 in a partially closed position (shown in FIG. 1) where an upper fill space 56 is provided between the exterior surface of the upper preform 54 and the surface of the upper mold part 26 that forms the upper surface of the mold cavity 32. The thickness of the upper fill space 56 is preferably substantially equal to the thickness of the lower fill space 52. However the thickness of either fill space can be adjusted to meet the needs of a particular article of manufacture.

It should also be noted that the mold cavity 32 is sealed by overlapping portions of the shear mold edges 28 and 30 when the mold cavity 32 is partially closed as shown in FIG. 1 and described above.

After the mold cavity 32 is partially closed a low viscosity resin, such as polyurethane having a viscosity in the range of 20–150 centipoise is injected into the fill spaces 52 and 56 that are provided adjacent the exterior surfaces of the preforms 50 and 54.

These fill spaces 52 and 56 are not completely filled but are preferably partially filled to about 50% of capacity by volume as shown in FIG. 1 so as to reduce the forming pressure requirements.

The blocks 20 are then retracted by the hydraulic motors 22 and the mold is completely closed by the hydraulic motors 18 as shown in FIG. 2. As the upper platen 14 descends the resin in fill spaces 52 and 56 is distributed across the exterior surfaces of the preforms 50 and 54 and forced into the porous preforms 50 and 54 so that the resin thoroughly penetrates throughout the interstices of the porous preforms 50 and 54 and bonds to the foam core 42. Descent of the upper mold part 26 to the fully closed position shown in FIG. 2 eliminates the fill spaces 52 and 56. Movement to the fully closed position also crushes the foam spacers 48 into the grooves 38 so that the exterior surface of the lower skin layer 40 is substantially planar as shown in FIG. 3.

When the resin cures, it forms the reinforced plastic skin layers 44 and 46 each of which has one of the porous, reinforcement preforms 50 or 54 embedded in it. After the resin cures, the mold is opened and the composite plastic article 40 is removed from the mold. The crushed foam spacers 48 may then be removed from the composite plastic article 40 or the lower mold part 24 as the case may be.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A method of squeeze molding a composite plastic article having a foam core between reinforced plastic skin layers comprising the steps of:
   placing a foam spacer, a lower porous reinforcement preform, a foam core and an upper reinforcement preform in series on a lower mold part so that the spacer supports the lower preform above a mold surface of the lower mold part,
   mating an upper mold part with the lower mold part in a partially closed position to form a sealed mold cavity containing the foam spacer, the lower reinforcement preform, the foam core and the upper reinforcement so that fill spaces are provided between the upper and the lower reinforcement preforms and the respective mold parts including lower fill spaces that are formed between the lower preform and the mold surface of the lower mold part adjacent the foam spacer,
   delivering a low viscosity resin into the fill spaces of the mold cavity while the upper mold part is held in the partially closed position, and
   then moving the mold parts to a fully closed position so as to crush the foam spacer and reduce the fill spaces to force the resin into the porous reinforcement preforms and bond the resin and the preforms to the foam core.

2. The method as defined in claim 1 wherein the fill spaces are only partially filled with resin so as to reduce the forming pressure requirements.

3. The method as defined in claim 2 wherein the fill spaces are filled with resin to about 50% of capacity by volume.

4. The method as defined in claim 1 wherein the foam spacer projects outwardly of a mold surface of the lower mold part and has a lower crush resistance than the preforms and the foam core.

5. The method as defined in claim 4 wherein the lower mold part has a groove for receiving the foam spacer that is crushed when the mold parts are moved to the fully closed position.

6. The method as defined in claim 5 wherein the resin is cured to form a composite article and the crushed spacer is removed from the mold or the composite article after the resin cures.

7. The method as defined in claim 1 wherein the fill spaces are eliminated when the mold parts are moved to the fully closed position.

8. A method of squeeze molding a composite plastic article having a foam core between reinforced plastic skin layers comprising the steps of:
   providing a lower mold part having a molding surface and a plurality of grooves in the molding surface,
   laying crushable foam spacers in the grooves so that the spacers project above the molding surface,
   laying a lower porous reinforcement preform, a foam core and an upper porous reinforcement preform in series on the foam spacers,
   mating an upper mold part with the lower mold part in a partially closed position to form a sealed mold cavity containing the foam spacers, the lower porous reinforcement preform, the foam core and the upper porous reinforcement preform so that fill spaces are provided adjacent the upper and lower porous reinforcement preforms, injecting a low viscosity resin into the fill spaces of the mold cavity until the fill spaces are filled with resin to about 50% of capacity by volume while the upper mold part is held in the partially closed position, and then moving the mold parts to a fully closed position to eliminate the fill spaces, crush the foam spacers into the grooves and force the resin to thoroughly penetrate throughout the interstices of the preforms and bond the resin and the preforms to the foam core.

9. A method of squeeze molding a composite plastic article having a foam core between reinforced plastic skin layers comprising the steps of:

providing a lower mold part having a molding surface supporting a crushable spacer on the lower mold part so that it projects above the molding surface, laying a premold assembly comprising a foam core sandwiched between a lower porous reinforcement preform and an upper porous reinforcement preform on the spacer so that a fill space is provided between the lower porous reinforcement preform and the molding surface, mating an upper mold part with the lower mold part in a partially closed position to form a sealed mold cavity containing the spacer, the premold assembly, and the fill space, injecting a low viscosity resin into the sealed mold cavity until the fill space is at least partially filled with resin while the mold parts are held in the partially closed position, and then moving the mold parts to a fully closed position to crush the spacer and eliminate the fill space and force the resin to thoroughly penetrate throughout the interstices of the preforms and bond the resin to the foam core.

* * * * *